United States Patent
Arnold et al.

(10) Patent No.: US 10,995,162 B2
(45) Date of Patent: May 4, 2021

(54) PROCESS FOR PRE-CONTACTING CATALYST COMPONENTS EX-REACTOR TO PRODUCE AMORPHOUS POLY ALPHA-OLEFINS

(71) Applicant: REXtac, LLC, Odessa, TX (US)

(72) Inventors: Mitchell Arnold, Odessa, TX (US); Andres Sustic, Odessa, TX (US); Steve Oetting, Odessa, TX (US); Nick Fowler, Odessa, TX (US)

(73) Assignee: REXTAC LLC, Odessa, TX (US)

( * ) Notice: Subject to any disclaimer, the term of this patent is extended or adjusted under 35 U.S.C. 154(b) by 68 days.

(21) Appl. No.: 16/508,491

(22) Filed: Jul. 11, 2019

(65) Prior Publication Data

US 2021/0017306 A1    Jan. 21, 2021

Related U.S. Application Data

(60) Provisional application No. 62/834,220, filed on Apr. 15, 2019.

(51) Int. Cl.
   *C08F 10/06* (2006.01)
(52) U.S. Cl.
   CPC .......... *C08F 10/06* (2013.01); *C08F 2410/01* (2013.01)
(58) Field of Classification Search
   CPC .................................................. C08F 10/06
   See application file for complete search history.

(56) References Cited

U.S. PATENT DOCUMENTS 4,380,508 A * 4/1983 Shipley .................. C08F 10/00
                                                        502/115
4,736,002 A * 4/1988 Allen .................... C08F 210/06
                                                        526/124.7

FOREIGN PATENT DOCUMENTS

WO   WO-2018054805 A1 * 3/2018 .............. C08F 6/003

OTHER PUBLICATIONS

Patterson Process Vessels, Reactors & Kettles (2000). (Year: 2000).*

* cited by examiner

*Primary Examiner* — Catherine S Branch
(74) *Attorney, Agent, or Firm* — Nolte Lackenbach Siegel (57) ABSTRACT

A continuous process for pre-contacting coordination polymerization catalyst components with each other before they are introduced into a polymerization reactor at 130 degrees Fahrenheit to 200 degrees Fahrenheit, where the activated coordination catalyst is contacted with at least one monomer to produce amorphous poly alpha olefin (APAO), the process involving blending a Ziegler-Natta pro-catalyst with a liquid carrier forming a Ziegler-Natta pro-catalyst slurry and flowing a co-catalyst mixture into the Ziegler-Natta pro-catalyst slurry continuously in a pre-contacting device, forming an activated Ziegler-Natta catalyst; continuously injecting the activated Ziegler-Natta catalyst into the heated polymerization reactor while simultaneously, and continuously, injecting propylene monomer and any other alpha-olefin monomers, and hydrogen gas for molecular weight control, initiating an exothermic reaction forming a monomer-polymer-catalyst slurry then continuously stirring the monomer-polymer-catalyst slurry forming an amorphous poly alpha olefin with a saturated backbone.

5 Claims, 5 Drawing Sheets

PROCESS FOR PRE-CONTACTING CATALYST COMPONENTS EX-REACTOR TO PRODUCE AMORPHOUS POLY ALPHA-OLEFINS

CROSS REFERENCE TO RELATED APPLICATION

This application claims the benefit of U.S. Provisional Application No. 62/834,220, filed Apr. 15, 2019.

FIELD

The present embodiment generally relates to a continuous process for pre-contacting Ziegler-Natta catalyst components to produce amorphous poly alpha olefin (APAO).

BACKGROUND

A need exists for a process for pre-contacting Ziegler-Natta catalyst components prior to being introduced into the reactor, where they are contacted with the monomer(s), to produce amorphous poly alpha olefin (APAO).

A further need exists to achieve the optimum formation of the alkylated and activated. Ziegler-Natta catalyst through a continuous process of pre-contacting Ziegler-Natta catalyst components prior to being introduced into the reactor where they are contacted with the monomer(s), to produce amorphous poly alpha olefin (APAO).

This process for pre-contacting catalyst components will also apply for the pre-contacting of metallocene pro-catalysts with methyl aluminoxane co-catalysts with the same expected process improvements by the formation of an activated coordination polymerization catalyst system.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present process in detail, it is to be understood that the process is not limited to the particular embodiments and that it can be practiced or carried out in various ways.

The invention relates to a continuous process for pre-contacting coordination polymerization catalyst components with each other before they are introduced into a polymerization reactor at 130 degrees Fahrenheit to 200 degrees Fahrenheit, where the activated coordination catalyst is contacted with at least one monomer to produce amorphous poly alpha olefin (APAO). A Ziegler-Natta pro-catalyst is blended with a liquid carrier forming a Ziegler-Natta pro-catalyst slurry. A co-catalyst mixture (consisting e.g., of an alkyl aluminum such as triethyl aluminum) is flowed into the flowing Ziegler-Natta pro-catalyst slurry continuously in a pre-contacting device forming an activated Ziegler-Natta catalyst. The activated Ziegler-Natta catalyst is continuously injected into the heated polymerization reactor while simultaneously continuously injecting into the polymerization reactor propylene monomer, and optionally ethylene monomer, 1-butene monomer, 1-hexene monomer, and hydrogen gas for melt viscosity control, initiating an exothermic reaction forming a monomer-polymer-catalyst slurry then continuously stirring the monomer-polymer-catalyst slurry forming an amorphous poly alpha olefin with a saturated backbone.

While these embodiments have been described with emphasis on the embodiments, it should be understood that within the scope of the appended claims, the embodiments might be practiced other than as specifically described herein.

A preferred coordination polymerization pro-catalyst of the Ziegler-Natta type, is a magnesium dichloride supported titanium-chloride inorganic solid.

The following definitions are used herein:

The term "neat co-catalyst" refers to the co-catalyst in pure, unadulterated form, with nothing added.

The term "diluted co-catalyst" refers to the neat co-catalyst that has been diluted with an alkane solvent.

The first step of the process involves maintaining a polymerization reactor at a temperature from 130 degrees Fahrenheit to 200 degrees Fahrenheit to form the desired amorphous poly alpha olefins (APAO).

APAO are presently used in a wide variety of applications including adhesives, sealants and coatings. Additionally, these materials may be blended with other materials to achieve a wide range of desired physical properties.

Amorphous poly alpha olefin polymers and processes for making such polymers are disclosed in U.S. Pat. Nos. 4,736,002, 4,847,400, 4,859,757, 5,302,675, 5,637,665, 5,714,554 and EP 0 6560 847 B1, the disclosures of which are incorporated herein for all purposes.

Amorphous poly alpha olefins are produced by the co-polymerization of $\alpha$-olefins, for example, ethylene (CAS #74-85-1, E), propylene (CAS #115-07-1, P), 1-butene (CAS #106-98-9, B-1) or 1-hexene (CAS #592-41-6, H-1), with Ziegler-Natta catalysts. Due to the specific nature of the polymerization process, the co-polymers have an amorphous structure.

Examples of amorphous poly alpha olefins include for example, amorphous (also known as atactic) polypropylene (APP, CAS #9003-07-0), amorphous propylene, polymer with ethylene (APE, CAS #9010-79-1), amorphous propylene, polymer with 1-butene (APB, CAS #29160-13-2), amorphous propylene, polymer with 1-hexene (APH, CAS #25895-44-7), amorphous 1-butene, polymer with 1-hexene (ABH, no CAS # found) copolymers, amorphous propylene, polymer with ethylene and 1-butene (APEB, CAS #25895-47-0), amorphous propylene, polymer with ethylene and 1-hexene (APEH, no CAS # found), amorphous propylene, polymer with 1-butene and 1-hexene (APBH, no CAS # found) terpolymers and finally amorphous propylene, polymer with ethylene, 1-butene and 1-hexene (APEBH, no CAS # found) tetrapolymers.

Amorphous propylene-based homopolymers, copolymers, terpolymers or tetrapolymers with ethylene or 1-butene or 1-hexene, can be produced in a continuously stirred tank reactor, CSTR, at an extended temperature range using a supported group 4 transition metal chloride such as magnesium dichloride supported titanium-chloride Ziegler-Natta pro-catalyst, and an organometallic co-catalyst. In some instances, the organometallic co-catalyst can be trialkylaluminum or a dialkylaluminum chloride, where each alkyl group can contain from one to nine carbon atoms, such as for example, trimethylaluminum (TMA, CAS #75-24-1), dimethylaluminum chloride (DMAC, CAS #1184-58-3), triethylaluminum (TEA, CAS #97-93-8) diethylaluminum chloride (DEAC, CAS #96-10-6), diisobutylaluminum chloride (DiBAC, CAS #1779-25-5) and triisobutylaluminum, (TiBAl, CAS #100-99-2). Triethylaluminum is preferably used.

More specifically, external to the polymerization reactor, a Ziegler-Natta pro-catalyst is blended with an organic liquid carrier. The liquid carrier has a viscosity from 150 centiStoke (cSt) to 400 cSt as measured at 40 degrees Celsius.

The pro-catalyst and liquid carrier, are mixed in a ratio of 1 lbs:4 lbs to 1 lbs:20 lbs forming a Ziegler-Natta pro-catalyst slurry A co-catalyst mixture is flowed continuously into a pre-contacting device while simultaneously flowing the Ziegler-Natta pro-catalyst slurry into the pre-contacting device forming an activated Ziegler-Natta catalyst with a co-catalyst to Ziegler-Natta pro-catalyst slurry molar ratio of from 20:1 to 500:1 of Group 13:Group 4 elements of the periodic table.

The co-catalyst mixture is formed from a co-catalyst, wherein the co-catalyst is at least one of a neat co-catalyst and a diluted co-catalyst, the co-catalyst being an alkylated metal from Group 13 of the periodic table; and optionally a diluted external electron donor which includes an alkoxysilane.

The activated magnesium dichloride supported titanium-chloride Ziegler-Natta catalyst is continuously injected into the heated polymerization reactor while simultaneously injecting propylene monomer and optionally ethylene monomer, or 1-butene monomer or 1-hexene monomer into the heated polymerization reactor initiating an exothermic reaction forming a monomer-polymer-catalyst slurry.

The monomer-polymer-catalyst slurry is continuously stirred in the polymerization reactor under a pressure from 120 psi to 550 psi using a residence time from 30 minutes to 5 hours forming an amorphous poly alpha olefin, wherein the amorphous poly alpha olefin has a saturated backbone.

The molecular weight of the formed homopolymers, copolymers, terpolymers and tetrapolymers of propylene, according to this invention may be controlled by the addition of an appropriate amount of a chain terminating agent, for example from about 0.5 mole % to about 3.5 mol % hydrogen gas, based on the monomer feed rate used in the process.

In some instances, an electron donating compound is used as one of the components of the co-catalyst mixture. The electron donating compound can be an alkoxysilane having the formula $R_nSi-(OR')_{4-n}$ where n=1-3, R=aryl or alkyl and $R'=C_{1-3}$.

The electron donating compound can be added concurrently with the pro-catalyst and the co-catalyst.

The electron donating compound can be added in a sufficient quantity such that the molar ratio of the co-catalyst to alkoxysilane is in the range from about 10:1 to about 500:1 and may be from 10:1 to 100:1.

The inclusion of the alkoxysilane electron donating compound, such as for example cyclohexylmethyl dimethoxysilane, (CMDMS, CAS #17865-32-6), phenyl triethoxysilane, (PES, CAS #780-69-8), diphenyl dimethoxysilane (DPDMS, CAS #6843-66-9), diisopropyl dimethoxysilane (DPDMS, CAS #18230-61-0), diisobutyl dimethoxysilane (DBDMS, CAS #17980-32-4) or dicyclopentyl dimethoxysilane (DCPDMS, CAS #126990-35-0), imparts some unique characteristics to the physical and mechanical properties of the amorphous copolymer, terpolymer and tetrapolymer, not achievable without the presence of the donor in the reaction medium, properties that may favorably affect the final performance of the hot melt adhesive containing the amorphous poly alpha olefin. Cyclohexylmethyl dimethoxysilane and phenyl triethoxysilane are preferably used.

In an embodiment, the electron donor is diluted from 0.01 wt % to 5 wt % with an alkane.

In some instances, a liquid organic chemical with specific performance properties is added concurrently with the pro-catalyst, the co-catalyst and the alkoxysilane in order to have the polymerization process in the CSTR run more smoothly.

In embodiments, the liquid carrier is mineral oil, petrolatum, or a mixture of mineral oil and petrolatum in a ratio between 99:1 and 1:99.

In embodiments, the co-catalyst is an alkyl aluminum (such as triethylaluminum).

In embodiments, the external electron donor is an alkoxysilane (such as cyclohexylmethyl dimethoxysilane).

In embodiments, hydrogen is added as a chain transfer agent to control the molecular weight of APAO.

In embodiments, the heating of the polymerization reactor is by steam heating.

In embodiments, a flash loop is used to remove unreacted monomers by receiving the amorphous poly alpha olefin and flowing the amorphous poly alpha olefin through a heat exchanger into a flash vessel using a positive displacement pump.

In embodiments, a plurality of heat exchangers are used in the flash loop.

In embodiments, the flash loop provides a pressure from 50 to 70 psi.

In embodiments, the process contemplates continuously passing the amorphous poly alpha olefin to a low-pressure heated flash loop having a pressure from 50 psi to 70 psi at a temperature from 350 degrees Fahrenheit to 425 degrees Fahrenheit to flash off unreacted monomer(s), and form amorphous poly alpha olefin (APAO) with less than from 0.1 wt % to 0.2 wt % unreacted monomer.

In embodiments, the process introduces a second alpha olefin monomer into the polymerization reactor, wherein the second alpha olefin monomer is at least one of: ethylene, 1-butene, or 1-hexene, forming a copolymer.

In embodiments, a third alpha olefin monomer is introduced with the first and second alpha olefin monomers into the polymerization reactor, wherein the third alpha olefin monomer is selected from the group: ethylene, 1-butene or 1-hexene, forming a terpolymer.

In embodiments, a fourth alpha olefin monomer is introduced into the polymerization reactor with the first, second, and third alpha olefin monomers, wherein the fourth alpha olefin monomer is selected from the group: ethylene, 1-butene and 1-hexene, forming a tetrapolymer.

In embodiments, the temperature of the polymerization reactor is maintained using a heating jacket surrounding the polymerization reactor or insulation enclosing the polymerization reactor.

In embodiments, the Ziegler-Natta pro-catalyst slurry flows at a flow rate from 0.2 lbs/hr to 20 lbs/hr.

Figure 1:
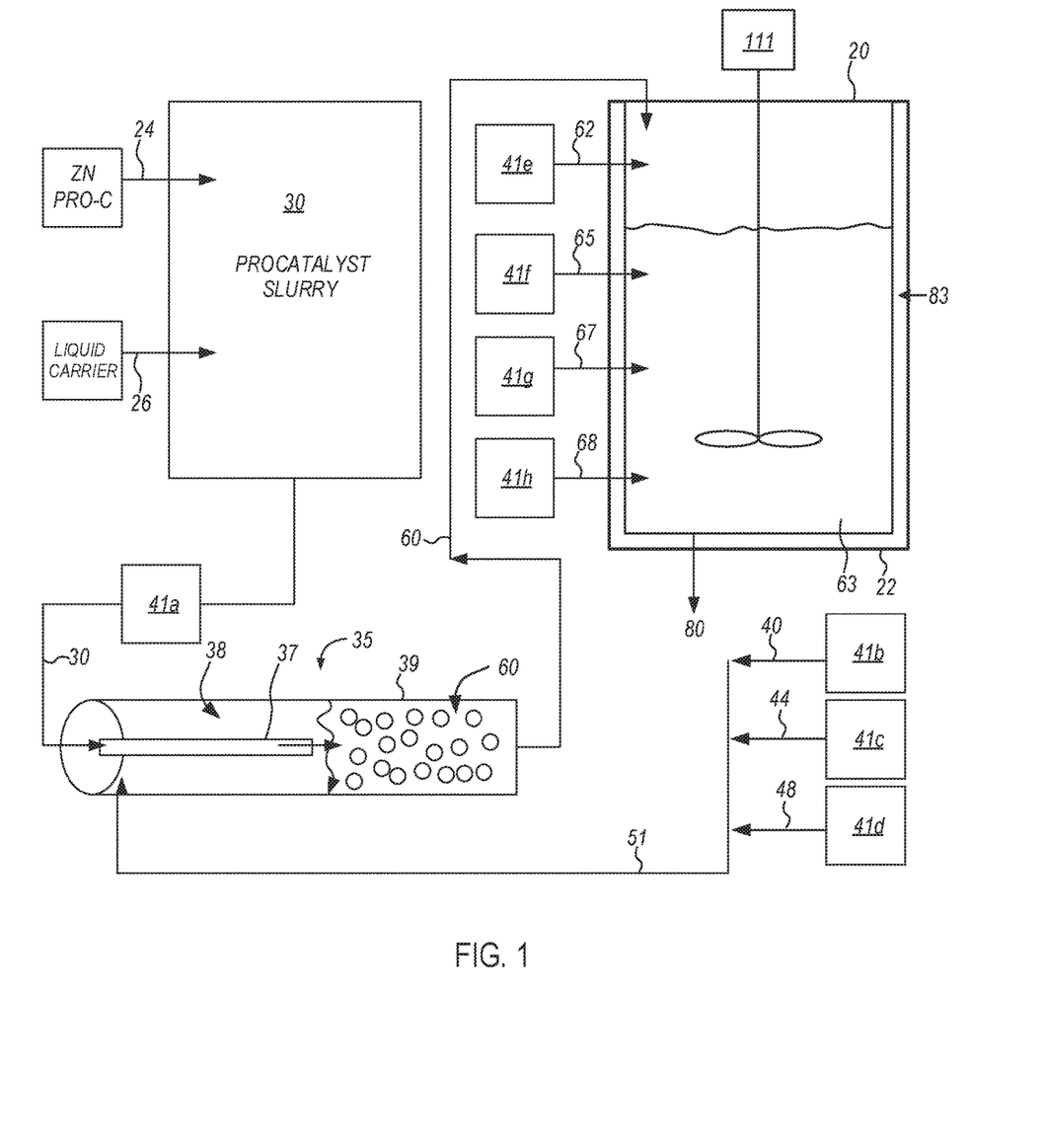
FIG. 1 depicts a diagram of the equipment used in the process of the invention.

Turning now to the Figures, FIG. 1 shows a continuous process for pre-contacting coordination polymerization catalyst components to produce amorphous poly alpha olefin (APAO).

The equipment includes a closed polymerization reactor 20 with a heating jacket 22 surrounding the polymerization reactor for startup of the reaction by injecting steam or other fluid into the reactor heating jacket.

The equipment includes a pro-catalyst slurry container 27.

A magnesium dichloride supported titanium-chloride Ziegler-Natta pro-catalyst 24 is injected into the pro-catalyst slurry container 27. A liquid carrier 26 is injected into the pro-catalyst slurry container 27 forming the Ziegler-Natta procatalyst slurry 30.

The liquid carrier 26 has a viscosity from 150 centiStoke (cSt) to 400 cSt units (measured at 40 degrees Celsius).

The pro-catalyst mixes with the liquid carrier in a ratio of 1 lbs:4 lbs to 1 lbs:20 lbs forming a Ziegler-Natta pro-catalyst slurry 30.

The equipment includes a pre-contacting device 35.

The pre-contacting device 35 has an inner tube 37, an outer tube 39 and an annulus 38.

Eight pumps are used 41a, 41b, 41c, 41d, 41e, 41f, 41g and 41h in this embodiment. If additional monomers or ingredients need to be used, then additional pumps can be added.

Pump 41a flows a Ziegler-Natta pro-catalyst slurry 30 into an inner tube 37.

Pump 41b flows a co-catalyst 40 into a conduit 51. The co-catalyst is at least one of a neat co-catalyst, a diluted co-catalyst or a mixture of a neat and a diluted co-catalyst. The co-catalyst consists of an alkylated metal from the Group 13 of the periodic table, such as triethylaluminum.

Pump 41c flows a diluted external electron donor 44 into the conduit 51. The diluted external electron donor can be an alkane solution. The external electron donor can be an alkoxysilane, such as cyclohexylmethyl dimethoxysilane The diluted external electron donor is added in a sufficient quantity such that the molar ratio of alkyl aluminum co-catalyst to alkoxysilane donor is in the range of 10:1 to 500:1, more preferably in the range of 20:1 to 100:1.

Pump 41d flows an optional component, such as a liquid organic chemical 48 with specific performance properties into the conduit 51.

The pre-contacting device 35 provides a residence time sufficient to alkylate the Ziegler-Natta pro-catalyst in the Ziegler-Natta pro-catalyst slurry 30 by 50% to 100% forming an activated Ziegler-Natta catalyst 60.

The molar ratio of trialkylaluminum co-catalyst to titanium-containing catalyst component, i.e., the Al/Ti ratio, should range between 20:1 and 500:1, preferably between 30:1 and 120:1.

Continuously, the activated Ziegler-Natta catalyst 60 is injected into the preheated polymerization reactor 20 while simultaneously at least a propylene monomer 62 is pumped into the polymerization reactor using a pump 41e into the preheated polymerization reactor 20 initiating an exothermic reaction forming a monomer-polymer-catalyst slurry 63.

More than one monomer can be added simultaneously with the process to produce a copolymer of the amorphous poly alpha olefin 81.

More specifically, an optional ethylene monomer 65, in the form of gas can be injected by pump 41f.

The formed monomer-polymer-catalyst slurry 63 is constantly mixed, constantly stirred, as components are continuously injected in the heat controlled polymerization reactor 20 under a pressure from 120 psi to 550 psi using a residence time from 30 minutes to 5 hours forming an amorphous poly alpha olefin 80, which is continuously harvested from the polymerization reactor 20 wherein the amorphous poly alpha olefin has a saturated backbone.

FIG. 1 also shows that a second alpha olefin monomer, the optional ethylene monomer 65, can be introduced into the polymerization reactor 20 with pump 41f.

In embodiments, wherein the third alpha olefin monomer 67 can be: hexene-1 liquid, or butene-1 liquid, instead of optional ethylene monomer 65 forming a copolymer.

FIG. 1 depicts that a third alpha olefin monomer 67 can be introduced into the polymerization reactor 20 with pump 41g, wherein the third alpha olefin monomer is selected from the group: 1-hexene liquid, 1-butene liquid or ethylene gas forming a terpolymer.

FIG. 1 depicts that a fourth alpha olefin monomer 68 can be introduced into the polymerization reactor 20 with pump 41h, wherein the fourth alpha olefin monomer is selected from the group: hexene-1 liquid, butene-1 liquid and ethylene gas forming a tetrapolymer.

When 2 monomers are used, the formed APAO can be a copolymer.

When 3 monomers are used, the formed APAO can be a terpolymer.

When 4 monomers are used, the formed APAO can be a tetrapolymer.

FIG. 1 shows that the mixing can be done using electric motor 111 in the polymerization reactor, driving stirring paddles.

FIG. 1 also depicts air space 83 between an exemplary heating jacket and the polymerization reactor 20 when other types of heating are used to increase temperature of the contents of the reactor.

Figure 2A:
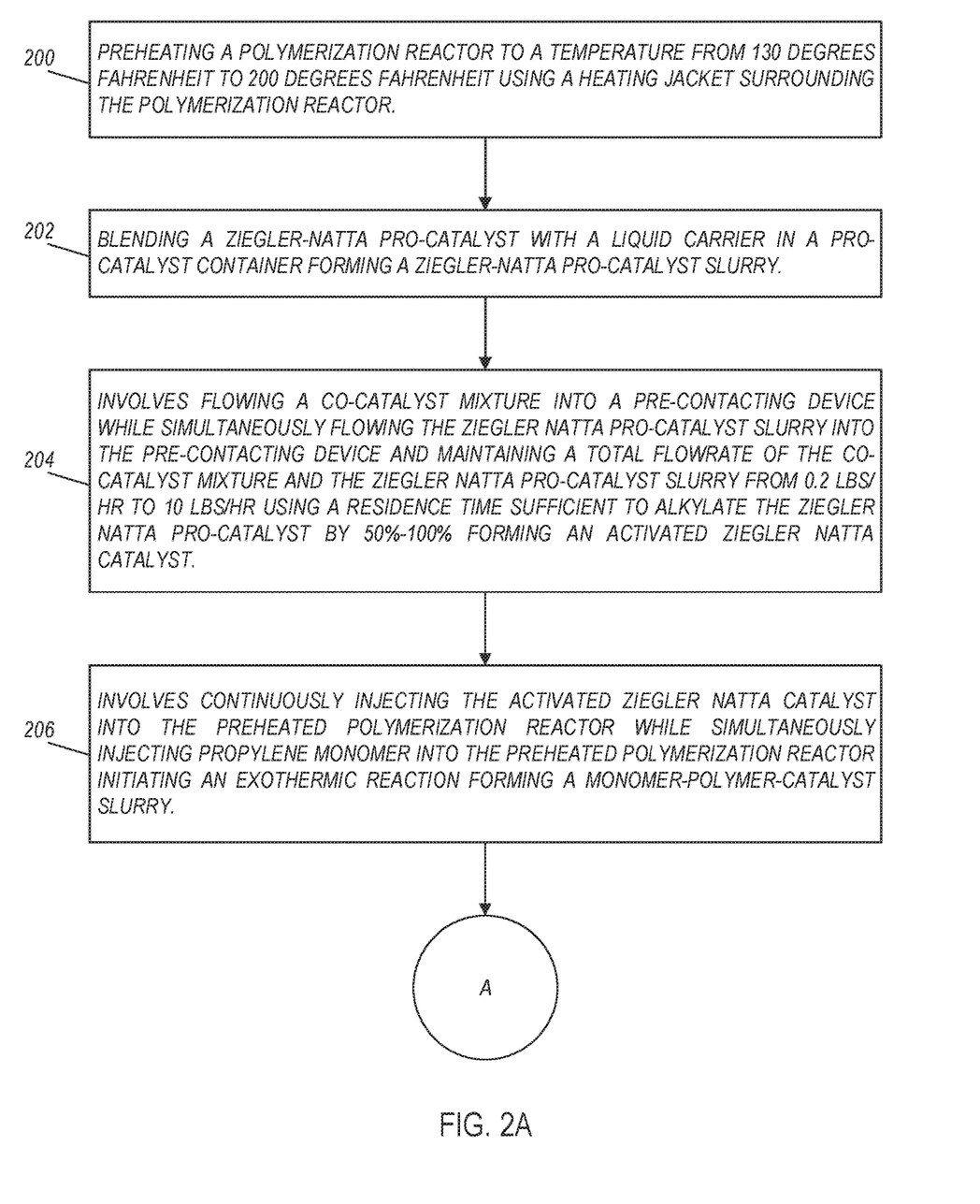
FIG. 2A-FIG. 2C depict method steps according to the invention.
Figure 2B:
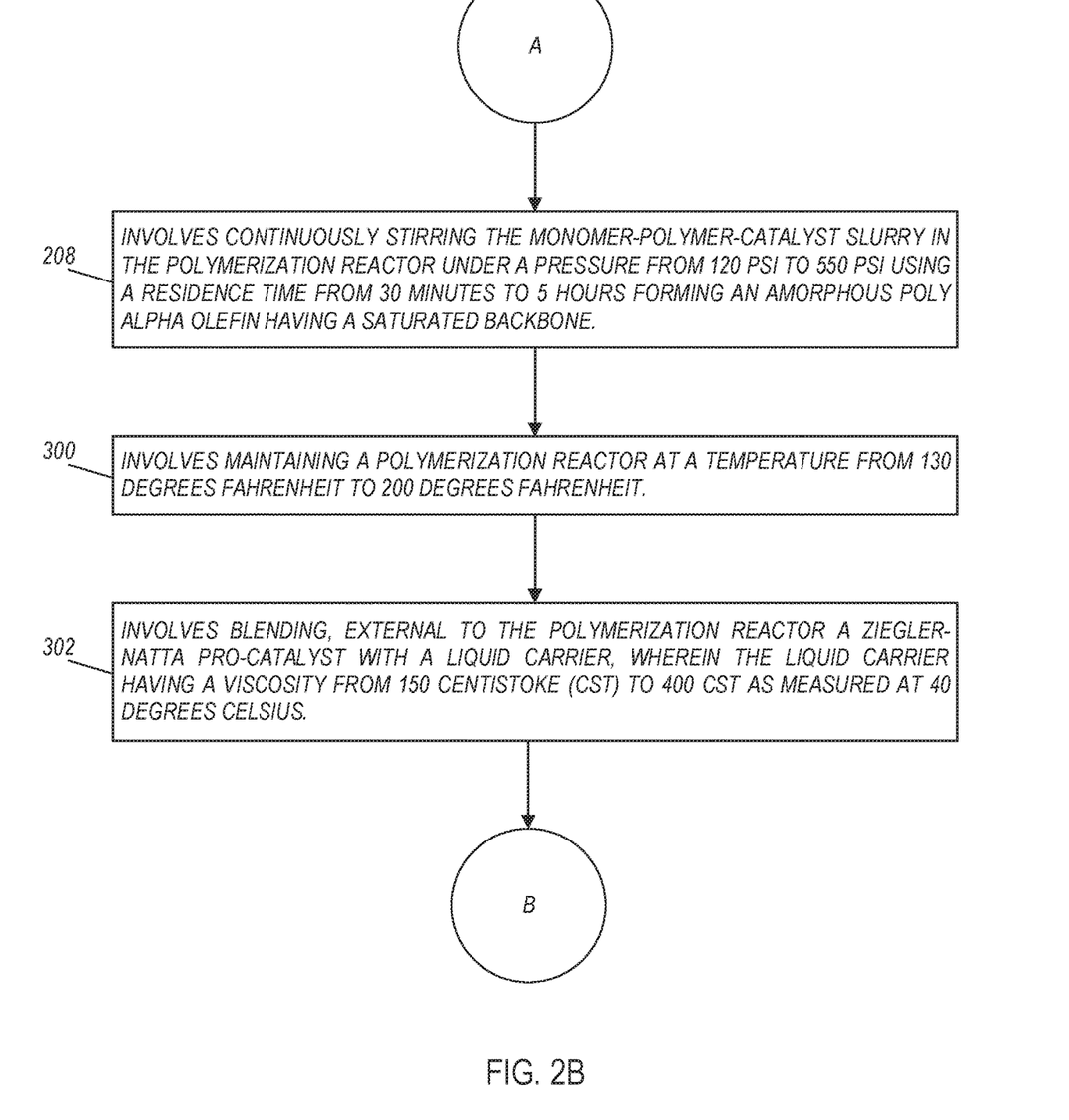
Figure 2C:
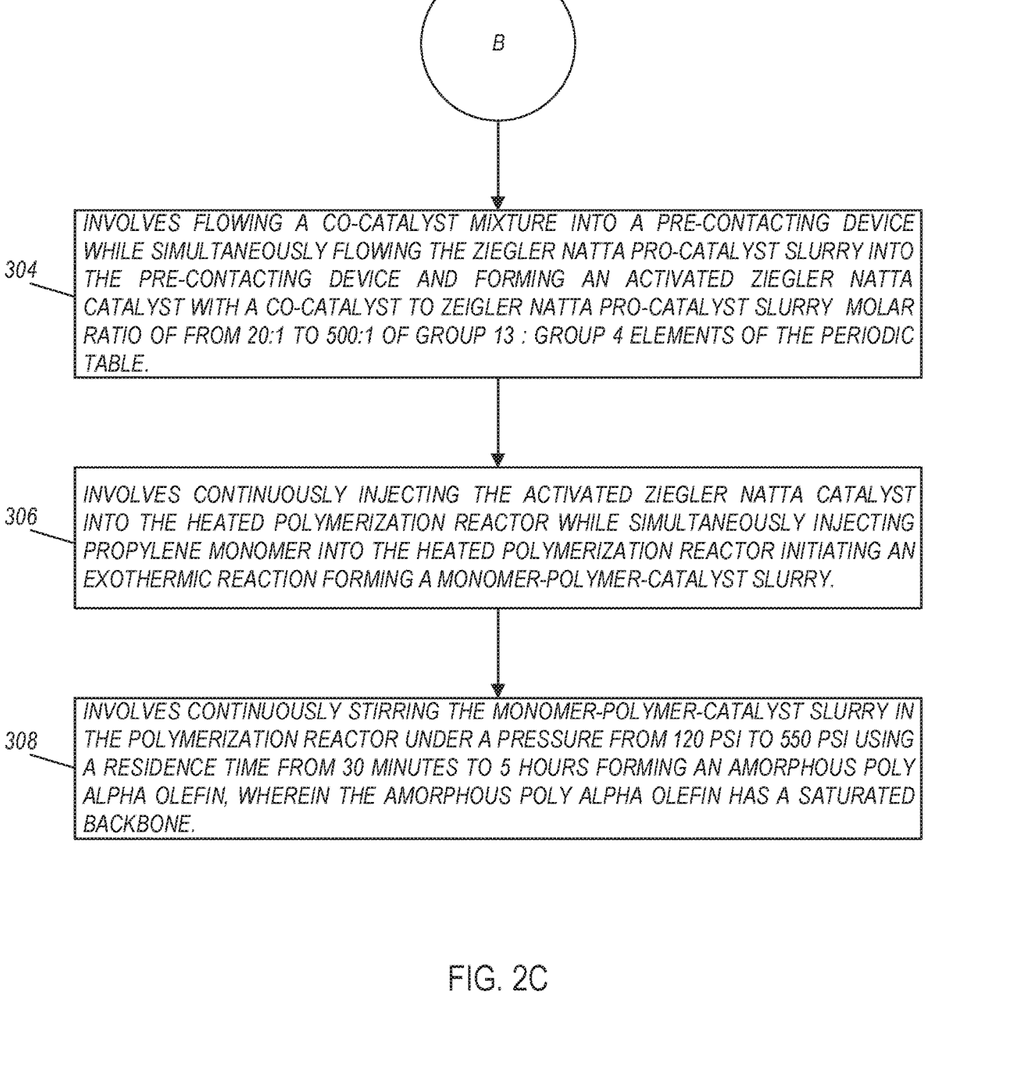
Figure 3:
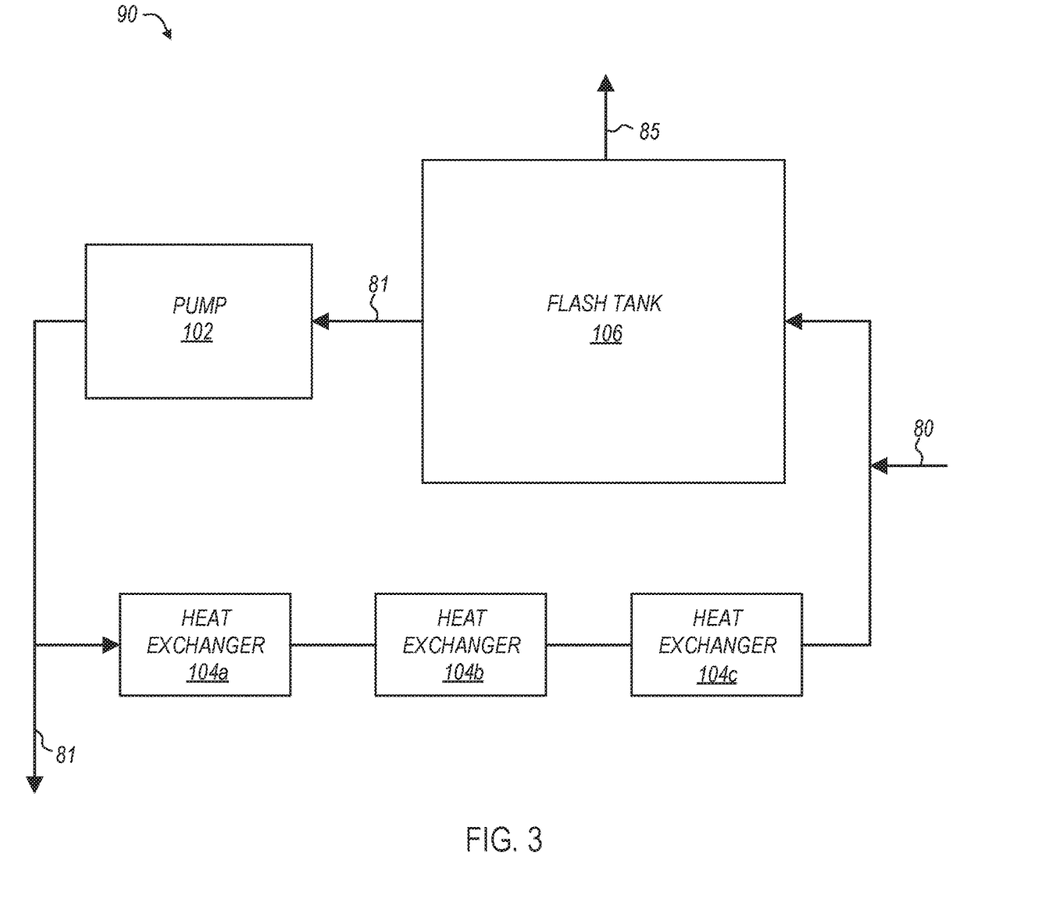
FIG. 3 depicts a diagram of the flash loop used in the process of the invention.

FIG. 2A-FIG. 2C depict a series of steps used in the process.

The continuous process for pre-contacting coordination polymerization catalyst components to produce amorphous poly alpha olefin (APAO) involves as Step 120: preheating a polymerization reactor to a temperature from 130 degrees Fahrenheit to 200 degrees Fahrenheit using a heating jacket surrounding the polymerization reactor.

Step 202 involves blending a magnesium dichloride supported titanium-chloride Ziegler-Natta pro-catalyst with a liquid carrier in a pro-catalyst slurry container 27 forming a Ziegler-Natta pro-catalyst slurry.

The liquid carrier has viscosity of 150 cSt to 400 cSt units (measured at 40 degrees Celsius).

The pro-catalyst is mixed with the liquid carrier in a ratio of 1:4 to 1:20.

Step 206 involves continuously injecting the activated Ziegler-Natta catalyst into the preheated polymerization reactor while simultaneously injecting propylene monomer into the preheated polymerization reactor initiating an exothermic reaction forming a monomer-polymer-catalyst slurry.

Step 208 involves continuously stirring the monomer-polymer-catalyst slurry in the polymerization reactor under a pressure from 120 psi to 550 psi using a residence time from 30 minutes to 5 hours forming an amorphous poly alpha olefin having a saturated backbone.

In an embodiment, the diluted electron donor is diluted from 0.01% to 5% with an alkane. In some instances, it is not necessary to add an external alkoxysilane donor.

In an embodiment, the liquid carrier can be a mineral oil, a petrolatum, or a mixture of mineral oil and petrolatum at any ratio between 99:1 and 1:99.

In this embodiment, the co-catalyst can be triethyl aluminum.

In this embodiment, an external heater can be used to provide steam heat to the jacket of the polymerization reactor.

FIG. 2A-FIG. 2C show a process wherein Step 300 involves maintaining the polymerization reactor at a temperature from 130 degrees Fahrenheit to 200 degrees Fahrenheit.

Step 302 involves blending, external to the polymerization reactor, a Ziegler-Natta pro-catalyst with a liquid carrier, wherein the liquid carrier has a viscosity from 150 centiStoke (cSt) to 400 cSt as measured at 40 degrees Celsius.

The blending of the pro-catalyst to liquid carrier is in a ratio of 1 lbs:4 lbs to 1 lbs:20 lbs forming a Ziegler-Natta pro-catalyst slurry.

Step 304 involves flowing a co-catalyst mixture into a pre-contacting device while simultaneously flowing the Ziegler-Natta pro-catalyst slurry into the pre-contacting device and forming an activated Ziegler-Natta catalyst with a co-catalyst to Ziegler Natta pro-catalyst slurry molar ratio of from 20:1 to 500:1 of Group 13:Group 4 elements of the periodic table.

Step 306 involves continuously injecting the activated Ziegler-Natta catalyst into the heated polymerization reactor while simultaneously injecting propylene monomer into the heated polymerization reactor initiating an exothermic reaction forming a monomer-polymer-catalyst slurry.

Step 308 involves continuously stirring the monomer-polymer-catalyst slurry in the polymerization reactor under a pressure from 120 psi to 550 psi using a residence time from 30 minutes to 5 hours forming an amorphous poly alpha olefin, wherein the amorphous poly alpha olefin has a saturated backbone.

FIG. 5 shows an embodiment, wherein the continuous process for pre-contacting coordination polymerization catalyst components to produce finished amorphous poly alpha olefin 81 uses a flash loop 90 to remove unreacted monomers 85 from a flash vessel 106 while continuously receiving the amorphous poly alpha olefin 80 from the reactor.

The flash loop 90 flows the amorphous poly alpha olefin 80 from the reactor into a flash vessel 106, using a positive displacement pump 102.

The positive displacement pump 102 flows the amorphous poly alpha olefin 81 past at least one heat exchanger 104a. In other embodiments, as shown in this FIG. 5, a plurality of heat exchangers 104a, b, c are used in series, which then transfer the heated APAO 81 back into the flash vessel 106.

The plurality of heat exchangers can be from 1 to 6 shell and tube heat exchangers connected in series, and/or in parallel.

In another embodiment, a low-pressure heated flash loop 90 can be used with a pressure from 50 psi to 70 psi and a temperature from 350 degrees Fahrenheit to 425 degrees Fahrenheit to flash off unreacted monomer 85 and form finished amorphous poly alpha olefin 81 with less than from 0.1 to 0.2 wt % residual unreacted monomer(s).

EXAMPLE 1—Polymerization Reaction with Propylene Monomer

First, a polymerization reactor having a capacity of 200 gallons, is heated to a temperature of 145-155 degrees Fahrenheit.

Next, external to the polymerization reactor, a magnesium dichloride supported titanium chloride Ziegler-Natta pro-catalyst is blended with a mineral oil liquid carrier The liquid carrier having a viscosity of 150 centiStoke (cSt) as measured at 40 degrees Celsius.

The pro-catalyst-to-liquid carrier is mixed in a ratio of 10 lbs:90 lbs forming a Ziegler-Natta pro-catalyst slurry.

The next step involves flowing a co-catalyst mixture of triethylaluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated. Ziegler-Natta catalyst with a co-catalyst to Ziegler Natta pro-catalyst slurry molar ratio of 40:1 of aluminum:titanium.

In this example, the co-catalyst mixture is a neat co-catalyst that is an alkylated aluminum mixed with a diluted solution of an external electron donor such as cyclohexylmethyl dimethoxysilane.

The activated Ziegler-Natta catalyst is continuously injected into the heated polymerization reactor while simultaneously injecting propylene monomer and hydrogen gas, for melt viscosity control, initiating an exothermic reaction of from 145 to 155 degrees Fahrenheit forming a monomer-polymer-catalyst slurry.

The monomer-polymer-catalyst slurry is continuously stirred mechanically with an agitator at a rate of 68 rpm in the polymerization reactor under a pressure of 300-350 psi using a residence time of 70-80 minutes forming an amorphous propylene homopolymer (APP) wherein the amorphous poly alpha olefin has a saturated backbone.

The propylene homopolymer made under these conditions, has a melt viscosity (MV) at 375 degrees Fahrenheit of 3500 cps (or mPa·sec), determined as per ASTM test method D-3236 using a Brookfield RVT Viscometer and a #27 spindle.

EXAMPLE 2—Polymerization Reaction with Propylene and Ethylene Monomers

First, a polymerization reactor having a capacity of 200 gallons, is heated to a temperature of 155-160 degrees Fahrenheit.

Next, external to the polymerization reactor, a magnesium dichloride supported titanium chloride Ziegler-Natta pro-catalyst is blended with a mineral oil liquid carrier.

The liquid carrier having a viscosity of 165 centiStoke (cSt) as measured at 40 degrees Celsius.

The pro-catalyst-to-liquid carrier is mixed in a ratio of 8 lbs:92 lbs forming a Ziegler-Natta pro-catalyst slurry.

The next step involves flowing a co-catalyst mixture of triethylaluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 50:1 of aluminum:titanium.

In this example, the co-catalyst mixture is a neat co-catalyst that is an alkylated aluminum. No external alkoxysilane donor is added.

The activated Ziegler-Natta catalyst is continuously injected into the heated polymerization reactor while simultaneously injecting propylene monomer, ethylene monomer and hydrogen gas, for melt viscosity control, initiating an exothermic reaction of from 155 to 160 degrees Fahrenheit forming a monomer-polymer-catalyst slurry. The weight ratio of propylene:ethylene in APAO is 87:13. The polymer composition is determined by FTIR spectroscopy.

The monomer-polymer-catalyst slurry is continuously stirred mechanically with an agitator at a rate of 68 rpm in the polymerization reactor under a pressure of 400-450 psi using a residence time of 55-70 minutes forming an amorphous propylene, polymer with ethylene (APE) wherein the amorphous poly alpha olefin has a saturated backbone.

The propylene, polymer with ethylene made under these conditions, has a melt viscosity (MV) at 375 degrees Fahrenheit of 5000 cps.

EXAMPLE 3—Polymerization Reaction with Propylene and 1-Butene Monomers

First, a polymerization reactor having a capacity of 200 gallons, is heated to a temperature of 160-165 degrees Fahrenheit.

Next, external to the polymerization reactor, a magnesium dichloride supported titanium chloride Ziegler-Natta pro-catalyst is blended with a mineral oil liquid carrier The liquid carrier having a viscosity of 182 centiStoke (cSt) as measured at 40 degrees Celsius.

The pro-catalyst-to-liquid carrier is mixed in a ratio of 8 lbs:92 lbs forming a Ziegler-Natta pro-catalyst slurry.

The next step involves flowing a co-catalyst mixture of triisobutylaluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 50:1 of aluminum:titanium.

In this example, the co-catalyst mixture is a neat co-catalyst that is an alkylated aluminum mixed with a diluted solution of an external alkoxysilane electron donor such as diphenyl dimethoxysilane.

The activated Ziegler-Natta catalyst is continuously injected into the heated polymerization reactor while simultaneously injecting propylene monomer, 1-butene monomer and hydrogen gas, initiating an exothermic reaction of from 160 to 165 degrees Fahrenheit forming a monomer-polymer-catalyst slurry. The weight ratio of propylene:1-butene is 63:37.

The monomer-polymer-catalyst slurry is continuously stirred mechanically with an agitator at a rate of 62 rpm in the polymerization reactor under a pressure of 300-350 psi using a residence time of 50-60 minutes forming an amorphous propylene, polymer with 1-butene (APB), wherein the amorphous poly alpha olefin has a saturated backbone.

The propylene, polymer with 1-butene made under these conditions, has a melt viscosity (MV) at 375 degrees Fahrenheit of 3000 cps.

EXAMPLE 4—Polymerization Reaction with Propylene and 1-Hexene Monomers

First, a polymerization reactor having a capacity of 200 gallons, is heated to a temperature of 170-180 degrees Fahrenheit.

Next, external to the polymerization reactor, a magnesium dichloride supported titanium chloride Ziegler-Natta pro-catalyst is blended with a mineral oil liquid carrier The liquid carrier having a viscosity of 240 centiStoke (cSt) as measured at 40 degrees Celsius.

The pro-catalyst-to-liquid carrier is mixed in a ratio of 10 lbs:90 lbs forming a Ziegler-Natta pro-catalyst slurry.

The next step involves flowing a co-catalyst mixture of trimethylaluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 60:1 of aluminum:titanium.

In this example, the co-catalyst mixture is a neat co-catalyst that is an alkylated aluminum. No external alkoxysilane donor is added.

The activated Ziegler-Natta catalyst is continuously injected into the heated polymerization reactor while simultaneously injecting propylene monomer, 1-hexene monomer and hydrogen gas, initiating an exothermic reaction of from 170 to 180 degrees Fahrenheit forming a monomer-polymer-catalyst slurry. The weight ratio of propylene:1-hexene is 50:50.

The monomer-polymer-catalyst slurry is continuously stirred mechanically with an agitator at a rate of 75 rpm in the polymerization reactor under a pressure of 130-145 psi using a residence time of 65-75 minutes forming an amorphous propylene, polymer with 1-hexene (APH), wherein the amorphous poly alpha olefin has a saturated backbone.

The propylene, polymer with 1-hexene made under these conditions, has a melt viscosity (MV) at 375 degrees Fahrenheit of 2200 cps.

EXAMPLE 5—Polymerization Reaction with Propylene, Ethylene and 1-Butene

First, a polymerization reactor having a capacity of 200 gallons, is heated to a temperature of 165-170 degrees Fahrenheit.

Next, external to the polymerization reactor, a supported titanium chloride Ziegler-Natta pro-catalyst is blended with a 4:1 mineral oil:petrolatum liquid carrier blend.

The liquid carrier blend having a viscosity of 285 centiStoke (cSt) as measured at 40 degrees Celsius.

The pro-catalyst to liquid carrier is mixed in a ratio of 12 lbs:88 lbs forming a Ziegler-Natta pro-catalyst slurry.

The next step involves flowing a co-catalyst mixture of diethylaluminum chloride into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 45:1 of aluminum:titanium.

In this example, the co-catalyst mixture is a neat co-catalyst that is an alkylated aluminum mixed with a diluted solution of an external alkoxysilane electron donor such as phenyl triethoxysilane.

The activated Ziegler-Natta catalyst is continuously injected into the heated polymerization reactor while simultaneously injecting propylene monomer, ethylene monomer, 1-butene monomer and hydrogen gas, initiating an exothermic reaction of from 165 to 170 degrees Fahrenheit forming a monomer-polymer-catalyst slurry. The weight ratio of propylene:ethylene:1-butene is 60:8:32.

The monomer-polymer-catalyst slurry is continuously stirred mechanically with an agitator at a rate of 65 rpm in the polymerization reactor under a pressure of 275-300 psi using a residence time of 50-60 minutes forming an amorphous propylene, polymer with ethylene and 1-butene (APEB), wherein the amorphous poly alpha olefin has a saturated backbone.

The propylene, polymer with ethylene and 1-butene made under these conditions, has a melt viscosity (MV) at 375 degrees Fahrenheit of 6500 cps.

EXAMPLE 6—Polymerization Reaction with Propylene, 1-Butene and 1-Hexene

First, a polymerization reactor having a capacity of 200 gallons, is heated to a temperature of 165-175 degrees Fahrenheit.

Next, external to the polymerization reactor, a supported titanium chloride Ziegler-Natta pro-catalyst is blended with a 4:1 mineral oil:petrolatum liquid carrier blend.

The liquid carrier blend having a viscosity of 380 centiStoke (cSt) as measured at 40 degrees Celsius.

The pro-catalyst to liquid carrier is mixed in a ratio of 14 lbs:86 lbs forming a Ziegler-Natta pro-catalyst slurry.

The next step involves flowing a co-catalyst mixture of triethylaluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 35:1 of aluminum:titanium.

In this example, the co-catalyst mixture is a neat co-catalyst that is an alkylated aluminum. No external alkoxysilane donor is added.

The activated Ziegler-Natta catalyst is continuously injected into the heated polymerization reactor while simultaneously injecting propylene monomer, 1-butene monomer, 1-hexene monomer and hydrogen gas, initiating an exothermic reaction of from 165 to 175 degrees Fahrenheit forming a monomer-polymer-catalyst slurry. The weight ratio of propylene:1-butene:1-hexene is 65:7:28.

The monomer-polymer-catalyst slurry is continuously stirred mechanically with an agitator at a rate of 68 rpm in the polymerization reactor under a pressure of 215-225 psi using a residence time of 80-90 minutes forming an amorphous propylene, polymer with 1-butene, 1-hexene (APBH), wherein the amorphous poly alpha olefin has a saturated backbone.

The propylene, polymer with 1-butene and 1-hexene made under these conditions, has a melt viscosity (MV) at 375 degrees Fahrenheit of 4120 cps.

EXAMPLE 7—Polymerization Reaction with Propylene, Ethylene, 1-Butene and 1-Hexene Monomers First, a polymerization reactor having a capacity of 200 gallons, is heated to a temperature of 180-185 degrees Fahrenheit.

Next, external to the polymerization reactor a supported titanium chloride Ziegler-Natta pro-catalyst is blended with a 3.5:1.5 mineral oil:petrolatum liquid carrier blend.

The liquid carrier blend having a viscosity of 346 centiStoke (cSt) as measured at 40 degrees Celsius.

The pro-catalyst to liquid carrier blend is mixed in a ratio of 11 lbs:89 lbs forming a Ziegler-Natta pro-catalyst slurry.

The next step involves flowing a co-catalyst mixture of triisobutyl aluminum into a pre-contacting device of a unique design of a first tube within a second tube, with the second tube positioned 4 inches into the center of the first tube.

The second tube has a diameter 66% the diameter of the first tube.

The co-catalyst is flowed into the pre-contacting device while simultaneously flowing the Ziegler-Natta pro-catalyst slurry into the pre-contacting device forming an activated Ziegler-Natta catalyst with a co-catalyst to Ziegler Natta pro-catalyst slurry molar ratio of 45:1 of aluminum:titanium.

In this example, the co-catalyst mixture is a neat co-catalyst that is an alkylated aluminum mixed with a diluted solution of an external alkoxysilane electron donor such as diisopropyl dimethoxysilane.

The activated Ziegler-Natty catalyst is continuously injected into the heated polymerization reactor while simultaneously injecting propylene monomer, ethylene monomer, 1-butene monomer, 1-hexene monomer and hydrogen gas, initiating an exothermic reaction of from 180 to 185 degrees Fahrenheit forming a monomer-polymer-catalyst slurry. The weight ratio of propylene:ethylene:1-butene:1-hexene is 52:8:17:23.

The monomer-polymer-catalyst slurry is continuously stirred mechanically with an agitator at a rate of 65 rpm in the polymerization reactor under a pressure of 245-255 psi using a residence time of 55-65 minutes forming an amorphous propylene, polymer with ethylene, 1-butene and 1-hexene (APEBH), wherein the amorphous poly alpha olefin has a saturated backbone.

The propylene, polymer with ethylene, 1-butene, and 1-hexene made under these conditions, has a melt viscosity (MV) at 375 degrees Fahrenheit of 6800 cps.

Table 1 shows the pertinent manufacturing process operating conditions and Lab test results for the APAOs obtained.

TABLE 1

| Process Conditions | Examples | | | | | | |
|---|---|---|---|---|---|---|---|
| | 1 | 2 | 3 | 4 | 5 | 6 | 7 |
| Reactor Temp., ° F. | 145-155 | 155-160 | 160-165 | 170-180 | 165-170 | 165-175 | 180-185 |
| Reactor Press., psi | 300-350 | 400-450 | 300-350 | 130-145 | 275-300 | 215-225 | 245-255 |

TABLE 1-continued

| Process Conditions | Examples | | | | | | |
|---|---|---|---|---|---|---|---|
| | 1 | 2 | 3 | 4 | 5 | 6 | 7 |
| Reactor agitator rate, rpm | 68 | 68 | 62 | 75 | 65 | 68 | 65 |
| Pro-catalyst to carrier ratio | 10:90 | 8:92 | 8:92 | 10:90 | 12:88 | 14:86 | 11:89 |
| Co-catalyst | TEA | TEA | TiBAl | TMA | DEAC | TEA | TiBAl |
| Al/Ti molar ratio | 40:1 | 50:1 | 50:1 | 60:1 | 45:1 | 35:1 | 45:1 |
| Alkoxysilane | CMDMS | None used | DPDMS | None used | PES | None used | DIDMS |
| Propylene-to alpha olefin weight ratios in polymer (1) | Homo-polymer | P:E = 87:13 | P:B-1 = 63:37 | P:H-1 = 50:50 | P:E:B-1 = 60:8:32 | P:B-1:H-1 = 65:7:28 | P:EB-1:H-1 = 52:8:17:23 |
| Reactor Residence time, min. | 70-80 | 55-70 | 50-60 | 65-75 | 50-60 | 80-90 | 55-65 |
| Melt Viscosity at 375° F., cps (2) | 3,500 | 5,000 | 3,000 | 2200 | 6,500 | 4,120 | 6,800 |

(1) Polymer composition determined by FTIR spectroscopy.
(2) Melt viscosity determined at 375 degrees Fahrenheit as per ASTM test method D-3236 using a Brookfield RVT Viscometer and a #27 spindle.

While these embodiments have been described with emphasis on the embodiments, it should be understood that within the scope of the appended claims, the embodiments might be practiced other than as specifically described herein.

What is claimed is:

1. A continuous process for pre-contacting coordination polymerization catalyst components with each other and at least one monomer to produce amorphous poly alpha olefin (APAO), the continuous process comprising:
   a. maintaining a polymerization reactor at a temperature from 130 degrees Fahrenheit to 200 degrees Fahrenheit;
   b. external to the polymerization reactor blending a Ziegler-Natta pro-catalyst with a liquid carrier, the liquid carrier having a viscosity from 150 centiStoke (cSt) to 400 cSt as measured at 40 degrees Celsius, the pro-catalyst to liquid carrier being mixed in a ratio of 1 lbs:4 lbs to 1 lbs:20 lbs forming a Ziegler-Natta pro-catalyst slurry;
   c. flowing a co-catalyst mixture into a pre-contacting device while simultaneously flowing the Ziegler-Natta pro-catalyst slurry into the pre-contacting device and forming an activated Ziegler-Natta catalyst with a co-catalyst to Ziegler Natta pro-catalyst slurry molar ratio of from 20:1 to 500:1 of an element from Group 13:an element of Group 4 of the periodic table, the co-catalyst mixture comprising:
      (i) a co-catalyst, wherein the co-catalyst is at least one of a neat co-catalyst and a diluted co-catalyst, the co-catalyst being an alkylated metal from Group 13 of the periodic table; and
      (ii) a diluted external electron donor;
   d. continuously injecting the activated Ziegler-Natta catalyst into the heated polymerization reactor while simultaneously injecting propylene monomer and optionally ethylene monomer or an alpha-olefin monomer and hydrogen gas for melt viscosity control, into the heated polymerization reactor initiating an exothermic reaction forming a monomer-polymer-catalyst slurry; and
   e. continuously stirring the monomer-polymer-catalyst slurry in the polymerization reactor under a pressure from 120 psi to 550 psi using a residence time from 30 minutes to 5 hours forming an amorphous poly alpha olefin, wherein the amorphous poly alpha olefin has a saturated backbone.

2. The continuous process of claim 1, wherein the external electron donor is diluted from 0.01% to 5% with an alkane.

3. The continuous process of claim 1, wherein the liquid carrier is mineral oil, petrolatum, or a mixture of mineral oil and petrolatum in a ratio between 99:1 and 1:99.

4. The continuous process of claim 1, wherein the co-catalyst is an alkyl aluminum.

5. The continuous process of claim 1, wherein the external electron donor is an alkoxysilane.

* * * * *